United States Patent [19]

Kobori

[11] Patent Number: 5,493,552
[45] Date of Patent: Feb. 20, 1996

[54] PHASE CHANGE OPTICAL INFORMATION RECORDING SYSTEM WITH A HEADER AREA IN THE FORM OF PREPIT ROWS

[75] Inventor: Hiromichi Kobori, Yokohama, Japan

[73] Assignee: Kabushiki Kaisha Toshiba, Kawasaki, Japan

[21] Appl. No.: 212,806

[22] Filed: Mar. 15, 1994

[30] Foreign Application Priority Data

Mar. 16, 1993 [JP] Japan .................................. 5-056170
Dec. 28, 1993 [JP] Japan .................................. 5-351050

[51] Int. Cl.$^6$ .................................................. G11B 7/00
[52] U.S. Cl. .................. 369/109; 369/275.1; 369/275.4; 369/44.26; 369/44.37
[58] Field of Search .............................. 369/275.2, 275.4, 369/44.37, 109, 13, 275.1, 93, 44.26

[56] References Cited

U.S. PATENT DOCUMENTS

| | | | |
|---|---|---|---|
| 5,177,720 | 1/1993 | Kondo ........................................ | 369/48 |
| 5,179,547 | 1/1993 | Komaki et al. ........................ | 369/275.4 |
| 5,199,022 | 3/1993 | Suzuki et al. ......................... | 369/275.1 |
| 5,199,023 | 3/1993 | Yamamoto et al. ................... | 369/275.4 |
| 5,210,738 | 5/1993 | Iwata et al. ............................ | 369/275.3 |
| 5,214,635 | 5/1993 | Satoh et al. ........................... | 369/275.2 |
| 5,383,176 | 1/1995 | Inui et al. .............................. | 369/275.4 |
| 5,404,345 | 4/1995 | Taki ...................................... | 369/275.4 |

FOREIGN PATENT DOCUMENTS 5282705  10/1993  Japan .

OTHER PUBLICATIONS

George S. Moore, "High Density Format for Sperry/Information Storage Inc., Second Generation Optical Drives," SPIE vol. 695, 1986, pp. 230–238.

Takashi Nakagomi et al., "Development of High Speed Magneto–Optical Disc Drive Using 4 Optical Head," IEICE Technical Report, 1990, 37–34.

K. Kayanuma et al: "High Track Density Magneto–Optical Recording using a Crosstalk Canceler" SPIE vol. 1316, pp. 35–39, Mar., 1990.

N. Miyagawa et al: "Improvement of Track Density by Land and Groove Recording on Phase Charge Optical Disk" ISOH/ODS'93 Conference Digest pp. 57–58, Jul., 1993.

Primary Examiner—Georgia Y. Epps
Assistant Examiner—Kim-Kwok Chu
Attorney, Agent, or Firm—Cushman, Darby & Cushman

[57] ABSTRACT

An optical recording and readout system comprises a first optical system for projecting a plurality of optical beams onto a phase-change optical disk, a second optical system for picking out the reflected light from the optical disk, a optical sensor for sensing the reflected light picked out by the second optical system, and a signal generating circuit for producing an information signal from the output signal from the optical sensor, wherein the phase-change optical disk contains a data area containing land tracks and groove tracks on both of which user information is recorded, the land tracks and groove tracks being formed on the data area alternately, and a header area in which header information is recorded in the form of prepit rows every other track with respect to the tracks including the land and groove tracks.

31 Claims, 13 Drawing Sheets

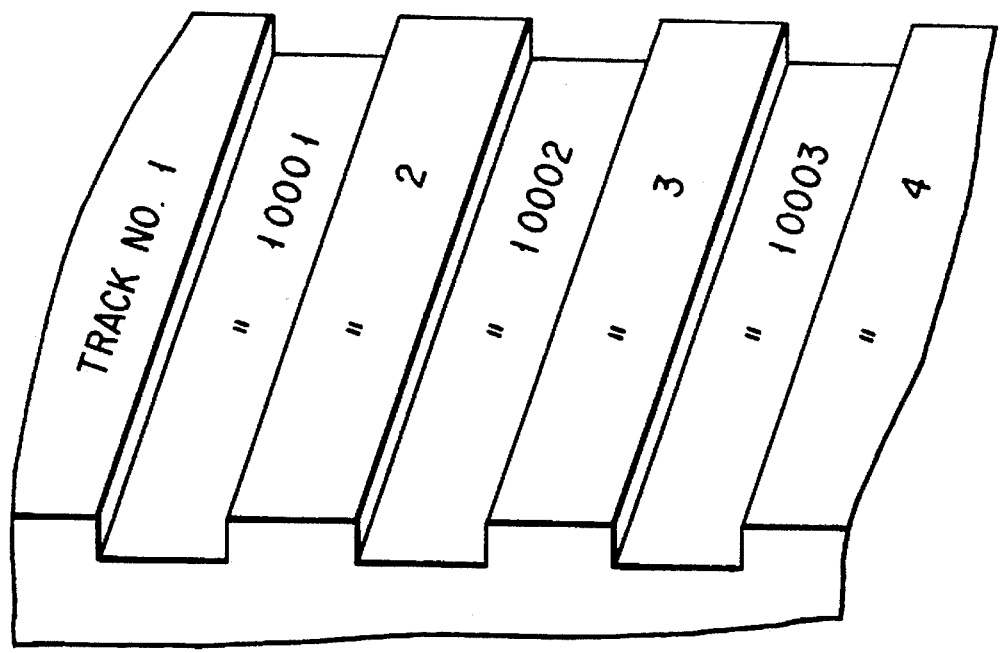
F I G. 11
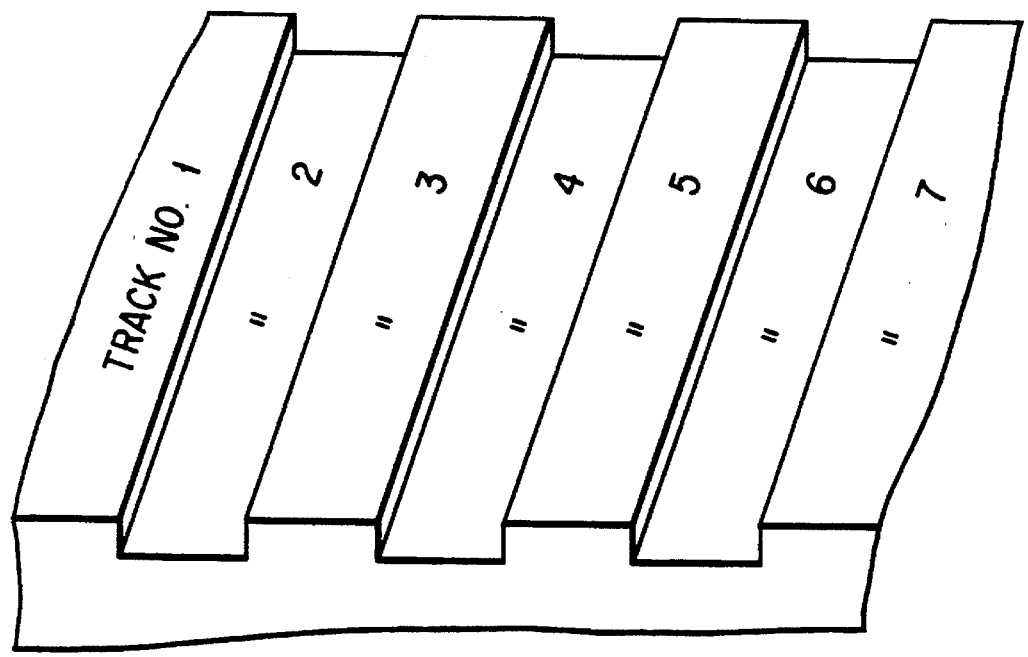
F I G. 12

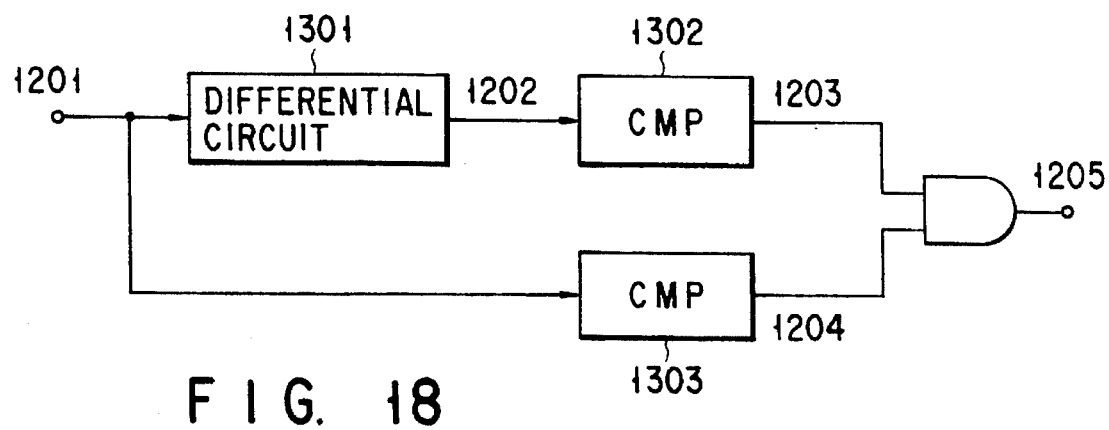
F I G. 18
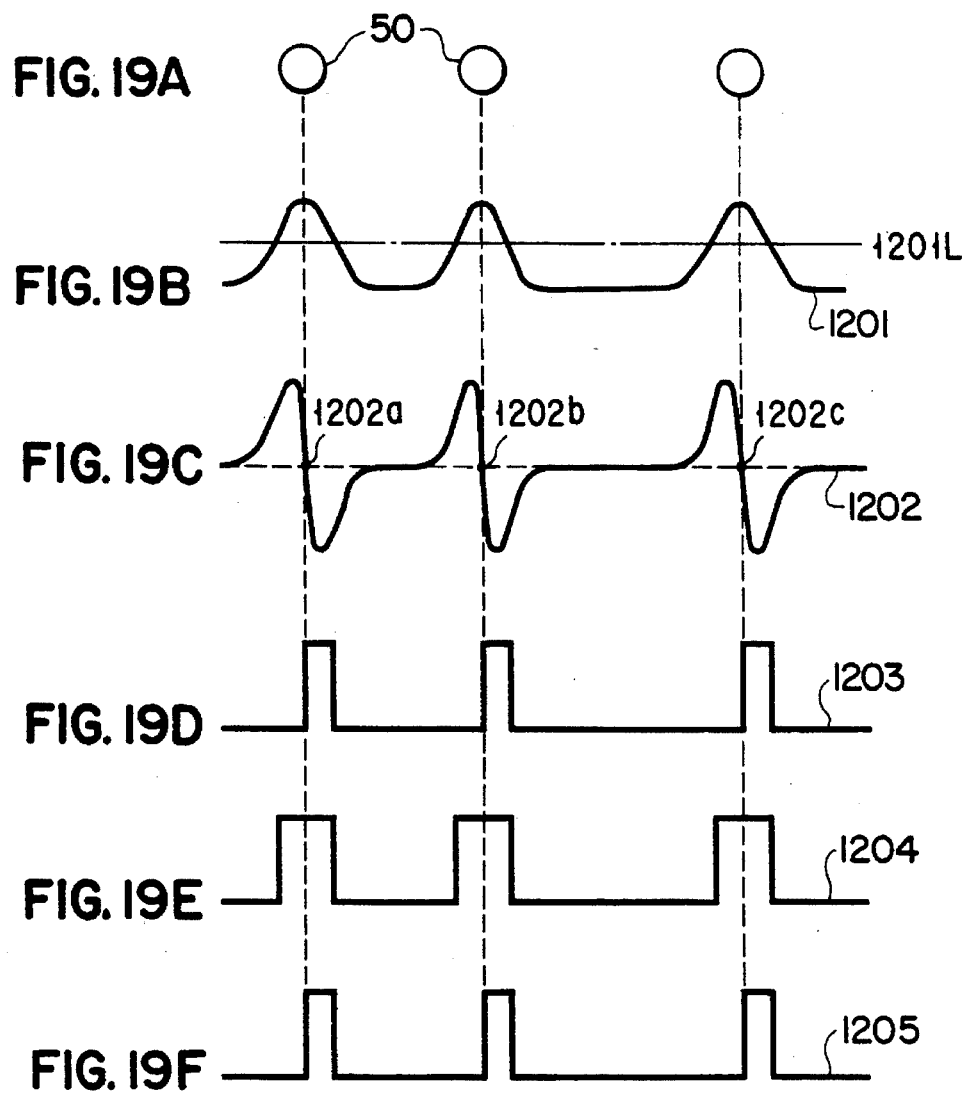

PHASE CHANGE OPTICAL INFORMATION RECORDING SYSTEM WITH A HEADER AREA IN THE FORM OF PREPIT ROWS

BACKGROUND OF THE INVENTION

1. Field of the Invention

This invention relates to an information recording medium such as an optical disk and an optical recording and readout system which optically records information onto such an information recording medium and optically reads out the recorded information.

2. Description of the Related Art

Recently, tremendous research and development efforts have been directed toward high density recording and readout techniques in the field of information recording and readout equipment using optical information recording mediums. For signal recording techniques, the mark position recording method that causes a signal to correspond to the center of a recording mark has been largely replaced with the mark edge recording method that causes a signal to correspond to a recording mark edge to achieve much higher recording density. Also, efforts are now being put into the development of much larger capacity optical disks by recording signals between tracks.

As a first conventional example, a method of achieving high track density using the sample servo system has been described in Moore, G. S., "High Density Format for Sperry Information Storage Inc. Second Generation Optical Drives," SPIE Vol. 695, pp230–238, 1986. With this method, recording marks are formed on a recording medium so as to be 180 degrees out-of-phase track by track. When the readout optical beam is positioned at the center of a recording mark significant for an information readout signal, the readout optical beam does not overlap with the recording marks located in adjacent tracks, thereby in reducing crosstalk. In this way, crosstalk from both adjacent tracks is decreased by changing the recording clock timing between even-numbered tracks and odd-numbered tracks, thereby achieving a large capacity as compared with a conventional equivalent.

A second conventional example has been described in K. Kayanuma et al., "High Track Density Magneto-Optical Recording using a Crosstalk Canceler," SPIE Vol. 1316, pp35–29, 1990. According to this example, three optical beams are caused to follow an inner-circumference land track, a central groove track, and an outer-circumference land track respectively, these tracks adjoin each other. The readout signals obtained by the three optical beams are adjusted in phase. Then, the two phase-adjusted readout signals obtained by the optical beams on both sides are adjusted in gain. The gain-adjusted signals are added to each other. The added signal is subtracted from the readout signal obtained by the central optical beam, thereby producing a readout signal by means of the central optical beam with reduced crosstalk.

In the case of applying the first conventional example to the mark edge recording method, when the readout optical beam is located at the edge portion of a prepit significant for an information readout signal, simply shifting the phase of the prepit 180 degrees permits the readout optical beam to illuminate two prepits in adjacent tracks, causing noticeable crosstalk. This not only reduces the reliability of the information readout signal, but also makes it difficult to apply this example to the mark edge recording method capable of realizing high density.

For the land & groove recording method explained in the second conventional example, it is necessary to eliminate crosstalk from adjacent tracks on both sides in the complicated three-beam optical head and the signal processing circuit. When the second conventional example is applied to an optical disk where the presence/absence of prepits or recording marks is sensed by the change of reflectivity, such as a readonly optical disk, a write once optical disk, or a phase-change optical disk, crosstalk caused by prepits or recording marks located on the adjacent tracks on both sides reduces the amplitude of the focus and track error signals seriously, which makes the focus and track servos unstable, thus reducing the reliability of the information readout signal.

SUMMARY OF THE INVENTION

The object of the present invention is to realize an optical recording medium from which a stable servo signal can be obtained, to provide a simple optical head capable of reducing crosstalk from adjacent tracks on both sides, and to provide an optical recording and readout system which assures high data reliability and enables high-density recording.

According to the present invention, it is possible to provide a phase-change optical recording medium comprising a data area containing land tracks and groove tracks on both of which user information is recorded, the land and groove tracks being formed alternately, and a header area in which header information is recorded in the form of prepit rows arranged in every other track with respect to the tracks including the land and groove tracks arranged alternately.

According to the invention, it is possible to provide a phase-change optical recording medium comprising a data area containing land tracks and groove tracks on both of which user information is recorded, the land and groove tracks being formed alternately, and a header area in which header information is recorded in the form of prepit rows each arranged in correspondence with one of the land and groove tracks.

The track numbers in the header information recorded only in either the groove tracks or the land tracks in the optical recording medium are set so as to increase consecutively or increment every other track successively from the inner to the outer circumference of the disk or the outer to the inner circumference.

According to the invention, it is possible to provide an optical recording and readout system comprising a first optical system for projecting a plurality of optical beams onto a phase-change optical recording medium, a second optical system for picking out the reflected light from the optical recording medium, a photodiode for sensing the reflected light picked out by the second optical system, and a signal generator circuit for producing an information signal from the photoelectric sense signal from the photodiode, wherein the phase-change optical recording medium contains a data area containing land tracks and groove tracks on both of which main information is recorded, the land and groove tracks being formed alternately, and a header area in which header information is recorded in the form of prepit rows arranged every other track with respect to the tracks including the land and the groove tracks alternately.

According to the invention, it is possible to provide an optical recording and readout system comprising a first optical system for projecting at least a single optical beam onto a phase-change optical recording medium, a second optical system for picking out the reflected light from the optical recording medium, a photodiode for sensing the reflected light picked out by the second optical system, and a signal generator for producing an information signal from the output signal from the photodiode, wherein the phase-change optical recording medium contains a data area containing land tracks and groove tracks on both of which main information is recorded, the land and groove tracks being formed alternately, and a header area in which header information is recorded in the form of prepit rows each arranged in correspondence with one of the land and groove tracks.

According to the invention, it is possible to provide an optical recording and readout system which records and reads out data onto or from each of groove and land tracks by projecting at least two optical beams onto adjacent tracks on an optical disk 2 to 20 times the converged beam diameter apart, and sensing coincidence with the target address number and sector number on the basis of the readout signal from the optical beam positioned on a track in which header information is recorded, By recording header information in every other track or by shifting the recording position of the header section alternately among the tracks including the land and groove tracks, it is possible not only to reduce crosstalk caused by prepits in the adjacent tracks on both sides, but also to suppress a decrease in the amplitude of the focus and track error signals as compared with a conventional device. Accordingly, a stable focus servo and track servo can be realized.

Furthermore, inverting the sign of the binary information signal track by track as described above makes it possible to reduce crosstalk caused by prepits or recording marks on the adjacent tracks on both sides. This makes less a decrease in the amplitude of the focus and track error signals than a conventional device. As a result, a stable focus and track servos can be realized.

Additionally, by designing and arranging photodiodes as described in the invention, and using only the output from the light-receiving surface located in the direction of the track projected image as an information readout signal, crosstalk due to the adjacent tracks on both sides can be reduced further, thereby improving the data reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram of a data recording gate signal generating circuit for producing a signal determining the recording start and end positions of the optical recording medium of FIG. 4;

FIG. 11 is a view for explaining a method of numbering tracks by a land & groove recording technique;

FIG. 12 is a view for explaining another method of numbering tracks by a land & groove recording technique;

FIG. 18 is a block diagram of a data binarization signal generating circuit for mark position recording by the sum signal of optical sensor outputs;

FIG. 19A–19F timing charts explaining the operation of the data binarization signal generating circuit of FIG. 18;

DETAILED DESCRIPTION OF THE PREFERRED EMBODIMENTS

Figure 1:
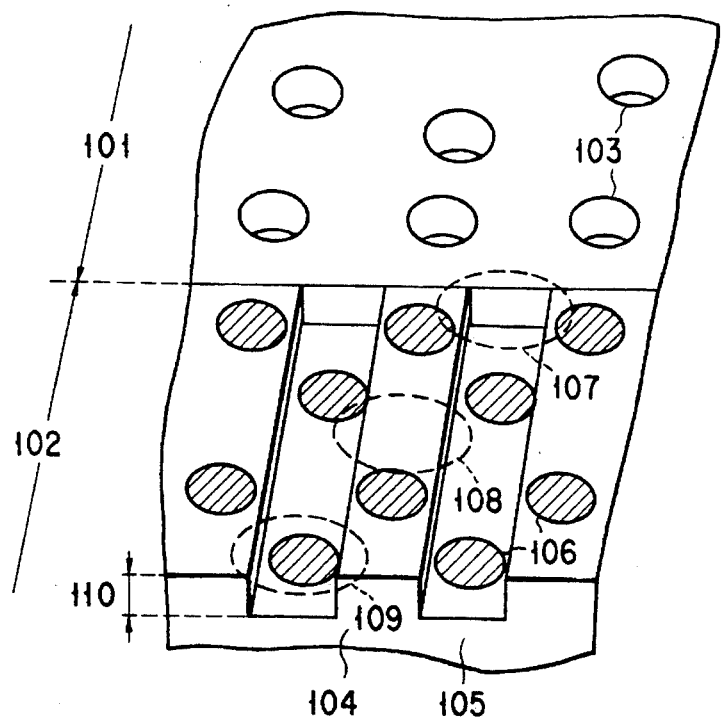
FIG. 1 is a view of a portion of an optical recording medium according to an embodiment of the present invention.

FIG. 1 shows a portion of an optical recording medium, or a phase-change optical disk, according to an embodiment of the present invention. The phase-change optical disk is an optical disk on or from which data is recoded or erased by using a reversible phase change between two states, one being an amorphous state (recording state) and the other a crystal state (erasing state), and from which data is read out by detecting a difference between the reflection factors of the two states. The phase-change optical disk is suitable for land & groove recording, where header information items including track numbers and sector numbers are recorded in a header area 101, and the user can record data in a data area 102. Continuous track guide grooves are formed only in the data area 102. The information tracks include projected tracks, i.e., land tracks 104 and recessed tracks, i.e., groove tracks 105.

In this embodiment, the header information is recorded in every other track, or only on the land track 104 in the form of intermittent bumpy prepits 103 on the header area 101. The user information is recorded on the disk in the form of phase-change recording marks 106 represented by hatched circles. At this time, the depth of the groove 110 is set at nearly $\lambda/6$ (where $\lambda$ is the wavelength of a light source), so that crosstalk between the land track 104 and the groove track 105 may be small in the data area 102. When the optical beam diameter is defined as a diameter of the beam where the intensity is $1/e^2$ of the maximum intensity (where e is an natural logarithm), the track pitch is set at one-third the diameter of the optical beam.

The embodiment is based on what is called a three beam method, where three optical beams 107, 108, and 109 represented by broken lines are projected 2 to 20 times the converged beam diameter apart onto the center of each of three adjacent tracks. Like an ordinary three beam method, the central optical beam 108 is used as a recording beam. The intensity of optical beams 107 and 109 on both sides serving as tracking beams is set at ⅕ to ⅒ the intensity of the central optical beam 108. When the land track 104 on which the header information is recorded is recorded onto or readout from, the header information is readout by projecting the central optical beam 108 onto the land track 104. On the basis of the header information, coincidence with the target track number and sector number is sensed, followed by a record/readout operation as in the prior art.

On the other hand, when the groove track 105 on which no header information is recorded is recorded onto or readout from, because the central optical beam 108 is positioned on the groove track 105, the optical beams 107 and 109 on both sides are positioned on the land tracks 104. Thus, by sensing coincidence with the target track number and sector number using one or both of the optical beams on both sides, the groove track 105 can be recorded onto or read out from.

In this way, forming headers every other track prevents not only the focus servo and the track servo from becoming unstable in the header area 101, but also the header information from being unable to be read out due to an increase in crosstalk, thereby assuring as high reliability as compared to that of a conventional optical disk apparatus. While in the illustrated embodiment, three optical beams are positioned on three adjacent tracks, it is apparent that a similar effect can be obtained by positioning two optical beams of the same density on two adjacent tracks. In this case, by reading out the header information by either optical beam, data can be simultaneously recorded on or read out from the land track and the groove track, thus doubling the recording/readout speed.

Figure 2:
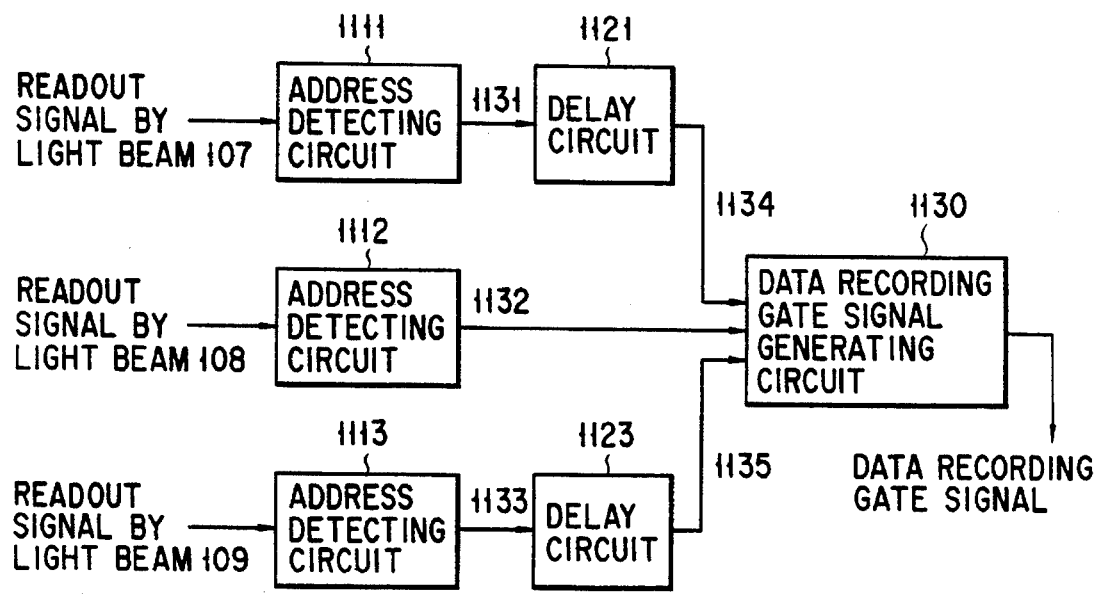
FIG. 2 is a block diagram of a data recording gate signal generating circuit for producing a signal determining the recording start and end positions of the optical recording medium of FIG. 1.

Referring to FIG. 2, a signal generating circuit will be described which produces a data recording gate signal (a signal indicating the data recording start and end positions) required to record data on a phase-change recording medium of the above-mentioned structure by a three beam method.

The readout signals from the side optical beam 107, the central optical beam 108, and the side optical beam 109 are supplied to address sensing circuits 1111, 1112, and 1113, respectively. A case will be considered where the central optical beam 108 is tracking on the land track 104 on which the header information is recorded, and the side optical beams 107 and 109 are tracking on the groove tracks 105 on which no header information is recorded. In this case, when data is recorded on the land track 104, address coincidence is sensed at the address sensing circuit 1112 on the basis of the readout signal obtained by the central optical beam 108, followed by the generation of a data recording gate start signal 1132, as with a conventional optical disk apparatus. On the basis of the data recording start signal 1132, a data recording gate signal is produced at the data recording gate generating circuit 1130. In response to the data recording gate signal, a data recording operation is carried out.

Next, a case will be considered where data is recorded on the groove track 105 on which no header information is recorded. In this case, the central optical beam 108 scans the groove track 105 without header information, and the side optical beams 107 and 109 scan the land tracks 104 with header information. Consequently, the address sensing circuits 1111 and 1113 to which the readout signals obtained by the side optical beams 107 and 109 sense address coincidence and output address coincidence signals 1131 and 1133. Because the side optical beam 107, the central optical beam 108, and the side optical beam 109 are spaced at specific intervals in the direction of the track, the address coincidence signal 1131 has an earlier address coincidence sense timing than the address confidence signal 1133. Thus, delay circuits 1121 and 1123 generate data recording start signals 1134 and 1135 delayed for time $\tau_1$ and $\tau_3$ (where $\tau_1 > \tau_3$) corresponding to the time from the address sense timing of the address coincidence signals 1131 and 1133 to when the central optical beam 108 reaches the data recording start position on the groove track 105. The generated signals are supplied to the data recording gate generating circuit 1130. In response to both or one of the data recording start signals 1134 and 1135, the data recording gate generating circuit 1130 operates to produce a data recording gate signal. According to the data recording gate signal, the central optical beam 108 records data on the groove track 105.

While in the CAV (Constant Angular velocity) recording system, the delay times $\tau_1$ and $\tau_3$ of the delay circuits 1121 and 1123 are fixed, in the ZCAV (Zone CAV) recording system, the delay times $\tau_1$ and $\tau_3$ must be changed depending on the disk radius position. To realize this, programmable delay lines can be used.

Figure 3:
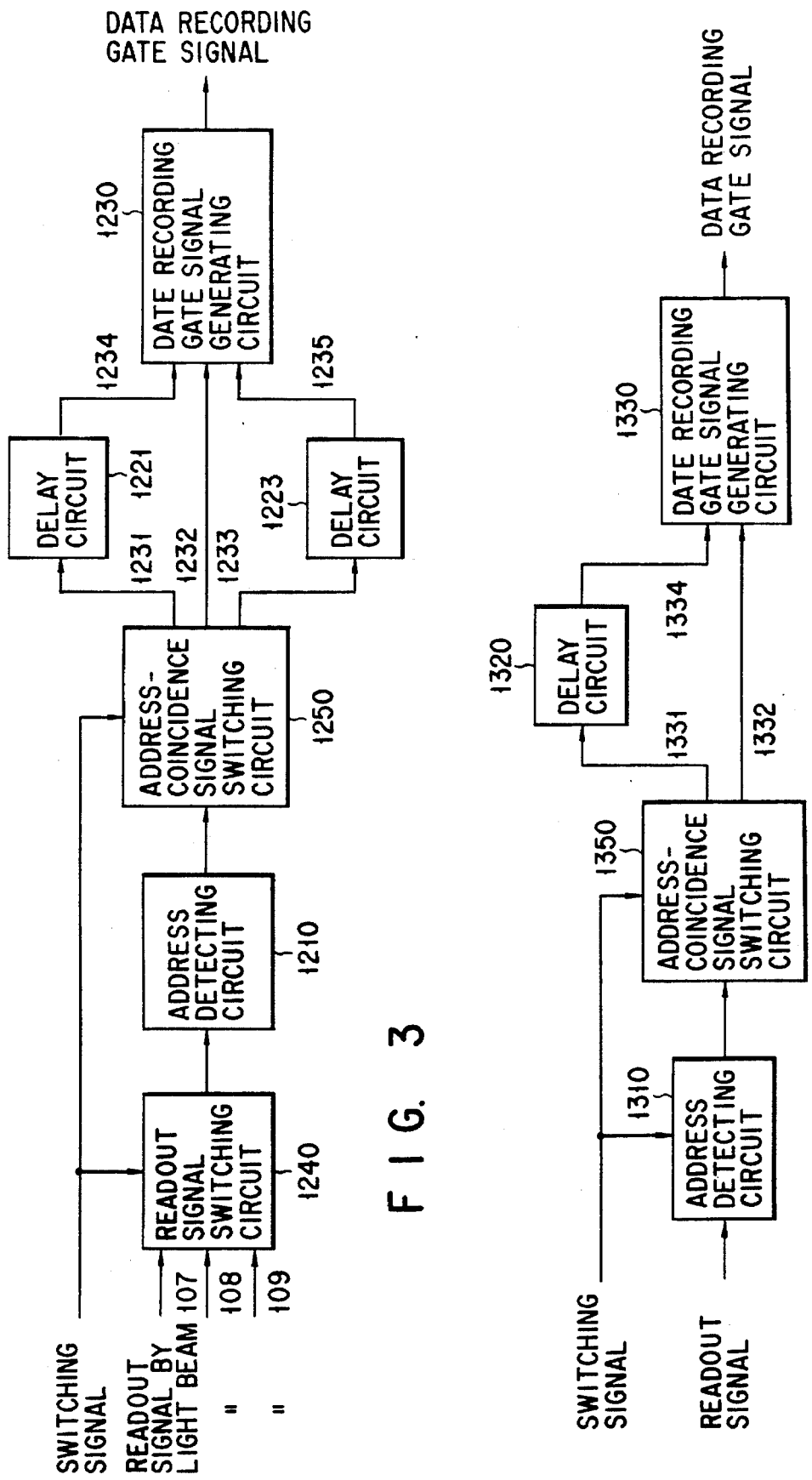
FIG. 3 is a block diagram of another data recording gate signal generating circuit.

FIG. 3 shows a modification of the data recording gate signal generating circuit. With this modification, when track numbers are given previously to land tracks and groove tracks as explained later, it is possible to distinguish the land tracks from the groove tracks on the basis of track numbers or whether the track number is even or odd. Thus, the readout signals obtained by the optical beams 107 and 108 are switched depending on the number of the target track to be recorded onto at a readout-signal switching circuit 1240 in response to a switching signal. Then, the switched signal is supplied to an address sensing circuit 1210. On the basis of the input readout signal, the address sensing circuit 1210 senses address coincidence. When address coincidence is sensed using the readout signal from the central optical beam 108, the address coincidence signal 1232 will be directly supplied to a data recording gate generating circuit 1230.

On the other hand, when address coincidence is sensed using the readout signal obtained by the side optical beam 107, the address coincidence signal 1231 is delayed for $\tau_1$ by the delay circuit 1221 as with the circuit of FIG. 2, and a data recording start signal 1234 is produced. When address coincidence is sensed using the readout signal obtained by the side optical beam 108, the address coincidence signal 1233 is delayed for $\tau_3$ by the delay circuit 1223, and a data recording start signal 1235 is produced. These start signals are supplied to the data recording gate generating circuit 1230. In this case, the switching of the address coincidence signal is done by an address coincidence signal switching circuit 1250, which may be operated by the above-mentioned switching signal with the modification, use of only one address sensing circuit makes the circuit configuration simpler than that of FIG. 2.

Figure 4:
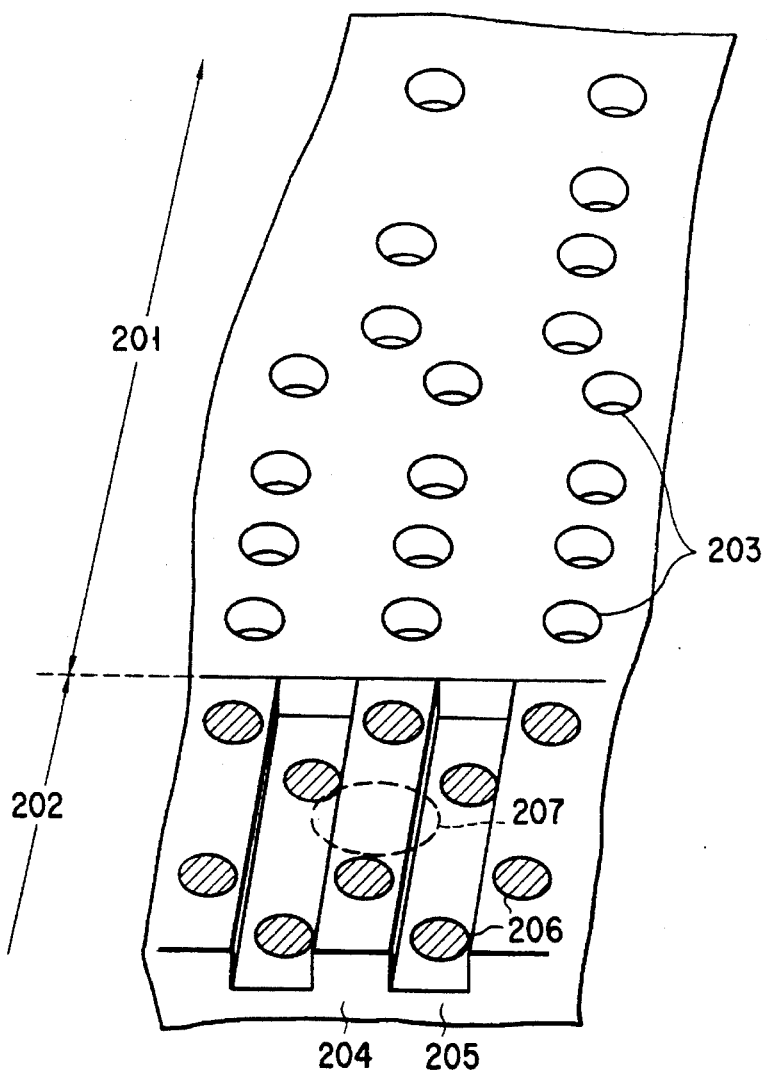
FIG. 4 is a view of a portion of an optical recording medium according to another embodiment of the present invention.

FIG. 4 shows a portion of an optical disk serving as an optical recording medium according to another embodiment of the present invention. As with the embodiment of FIG. 1, grooves are formed only in a data area 202. The land tracks 204, groove tracks 205, and recording marks 206 function as do those in FIG. 1. In this embodiment, in a header area 201, the header recording positions are staggered alternately between the land tracks 204 and the groove tracks 205. Specifically, rows of prepits forming header information are arranged in a staggered fashion so as to correspond to the land tracks 204 and the groove tracks 205. Because the prepit rows are spaced at one-track intervals, crosstalk will never develop in a readout by a single optical beam 207.

Accordingly, in the header area 201, neither the servo characteristic nor the crosstalk characteristic deteriorates. In this case, because the header area 201 needs twice the length required in a conventional equivalent, this may lead to a decrease in the disk recording capacity. However, since the length of the header area 201 is generally nearly 5% to 7% of the sector length, a decrease in the recording capacity is only 5% to 7% at most. On the contrary, because the header information is recorded on all the tracks, it is possible to achieve as highly reliable a recording/readout operation using a single optical beam 207 as a conventional optical disk apparatus.

In the above embodiment, the portion having no prepit between the prepit rows in the header area 201 has a mirror surface as shown in FIG. 4, but a groove may be formed on that portion.

FIG. 5 shows a data recording gate signal generating circuit for producing a data recording gate signal needed when data is recorded on the phase-change optical recording medium of FIG. 4. In the phase-change optical recording medium of FIG. 4, the header information recording positions are staggered alternately track by track. Thus, by knowing the track number or whether the track number is even or odd, it can be known whether the header information recording position of the target track is relatively in the front or in the rear in the optical beam scanning direction. Using the switching signal indicating the front and the rear of the header information recording position, the address sense timing at an address sensing circuit 1310 is adjusted, and an address coincidence signal is generated. The address coincidence signal is supplied to an address coincidence signal switching circuit 1350, which, according the switching signal indicating the front and the rear of the header information recording position, switches between a delay circuit 1320 and a data recording gate generating circuit 1330. Specifically, when the header information recording position is relatively in the front in the optical beam scanning direction, the delay circuit 1320 delays an address coincidence signal 1331 for time $\tau_0$ (the time corresponding to a blank section whose length is the same as that of the header information) to produce a data recording start signal 1334. In the case of a track where the header information recording position is in the rear in the optical beam scanning direction, an address coincidence signal 1332 is directly supplied to the data recording gate generating circuit 1330, which produces a data recording gate signal.

Figure 6:
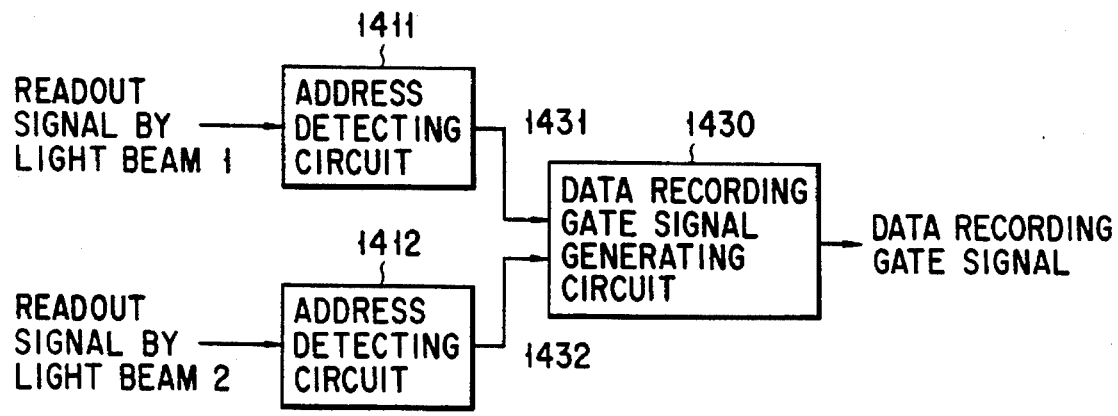
FIG. 6 is a block diagram of another data recording gate signal generating circuit used for recording onto the optical recording medium of FIG. 4.

FIG. 6 shows a data recording gate signal generating circuit used when two optical beams of the same intensity are projected onto two adjacent tracks. With this circuit, the readout signals obtained by optical beams 1 and 2 are supplied to address sensing circuits 1411 and 1412, respectively. When an optical disk where the header information is recorded every other track in FIG. 1 is used, either optical beam 1 or optical beam 2 never fails to sense address coincidence. Thus, by operating a data recording gate generating circuit 1430 by either address coincidence signal 1431 or 1432, a data recording gate signal can be generated. This makes it possible to read out and record data from and onto the land track 104 and the groove track 105 simultaneously.

Figure 7:
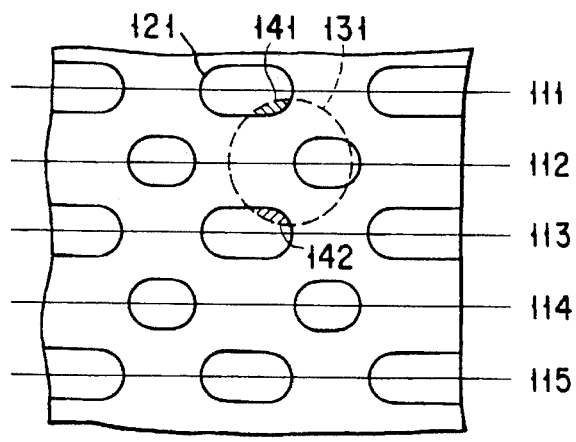
FIG. 7 is a drawing to help explain a method of recording information onto adjacent tracks.

FIG. 7 shows a portion of an optical disk serving as an optical recording medium according to a third embodiment of the present invention using a mark edge recording method. In the figure, solid lines 111, 112, 113, 114, and 115 indicate the imaginary center position of each information track, white oval-shaped circles 121 represent prepits, and a broken-line circle 131 denotes a readout optical beam. Here, it is assumed that FIG. 3 shows binary information items which closely resemble each other between adjacent tracks, such as header information items including track numbers and sector numbers. The prepits 121 in the adjacent tracks are arranged in a staggered fashion as shown in FIG. 7, so that the sign of the binary information, or the level variation of binary information signals, readout from the information tracks 111, 112, 113, 114, and 115 may be inverted track by track.

When a readout optical beam 131 is positioned at the edge portion of a prepit 121 significant for an information readout signal, the readout optical beam 131 illuminates both small portions 114 and 142 indicated by hatching of the two prepits 121 located on the adjacent tracks 111 and 113. However, since the simultaneously illuminated portions 141 and 142 are very small, crosstalk due to these portions is practically no problem. At the same time, a decrease in the amplitude of the focusing and tracking error signals can be minimized, which helps realize a stable focus and track servos. This means that when the crosstalk allowed value is set at a certain value, the present invention can provide a much narrower track pitch, or achieve higher track density. The third embodiment can also be applied to the first and second embodiments.

An optical disk serving as an optical recording medium according to a fourth embodiment of the present invention will be explained with reference to FIG. 8. In this embodiment, an optical disk has bumpy spiral or concentric track guide grooves. If recessed portions are groove portions and projected portions are land portions, information tracks will be made up of groove tracks 211, 213, and 215 and land tracks 212 and 214. The track guide groove is formed only in a data area 252 in which a recording mark 222 is located, and only prepits 221 are located in a header area 251. In this embodiment, since the prepits in the header area 251 and the groove in the data area 252 have the same depth, this optical disk provides the advantage of facilitating the formation of a disk substrate and its matrix very much.

Figure 8:
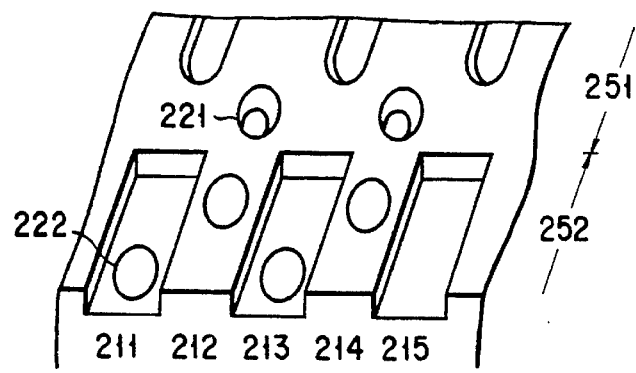
FIG. 8 is a drawing to help explain a method of recording information onto adjacent tracks by a land & groove recording technique.
Figure 9:
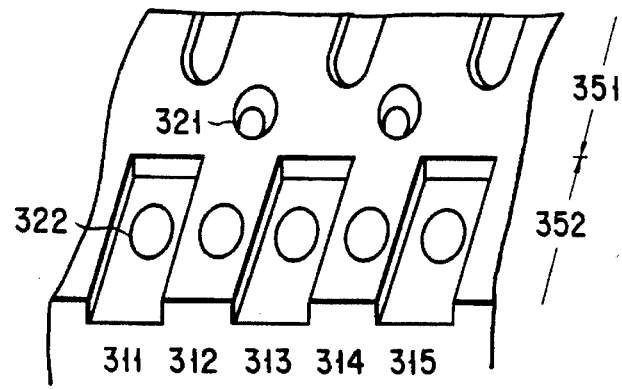
FIG. 9 is a drawing to help explain another method of recording information onto adjacent tracks by another land & groove recording technique.
Figure 10:
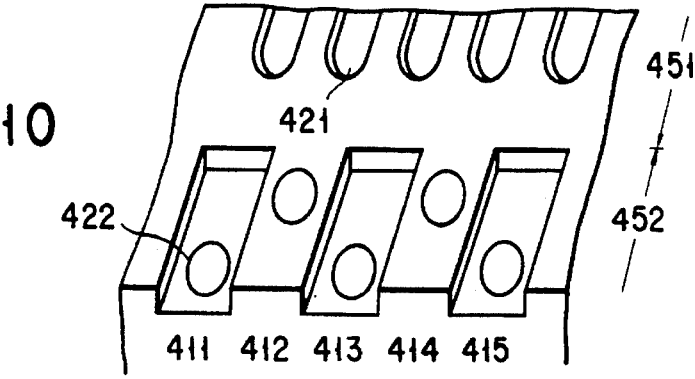
FIG. 10 is a drawing to help explain another method of recording information onto adjacent tracks by still another land & groove recording technique.

In the adjacent tracks in FIG. 8, the sign of the binary information for the prepits 221 and the recording mark 222 is inverted track by track, from which it is apparent that a similar effect to that in the third embodiment is obtained.

In the third and fourth embodiments, the sign of the binary information is inverted track by track in both the header areas and the data areas. Originally, data in the data areas is more at random than the header areas. Thus, as a fifth embodiment of the present invention, prepits may be arranged only in the header areas so that the sign of the binary information may be inverted track by track.

On the other hand, the time required for reading out data from the header area is 1/10 to 1/20 that required for the data area, with the result that an effect on the focus and track servos is small. Therefore, as a sixth embodiment of the present invention, marks may be formed in the data areas so that the sign of binary information may be inverted track by track. With the present invention, because the recording marks in the phase synchronizing portions (the synchronizing byte portion and the resynchornizing byte portion) in the important data area never fail to be inverted track by track to provide highly reliable data readout, crosstalk in the phase synchronizing portions is reduced in an optical disk apparatus especially using a mark edge recording system. Therefore, as compared with a conventional equivalent, the readout clock can be securely synchronized in phase with the recording data. It is needless to say that the fifth and sixth embodiments provide effects similar to (slightly short of, though) that of the third embodiment.

Next, a method of numbering tracks on an optical disk of the present invention will be described in detail.

FIG. 11 illustrates tracks near the innermost circumference on an optical disk, where track numbers (e.g., from track number 1 to track number 10000) are assigned to the land tracks from the disk inner circumference to the outer circumference, and similarly track numbers (e.g., from track number 10001 to track number 20000) are assigned to the groove tracks from the disk inner circumference to the outer circumference.

FIG. 12 illustrates tracks near the innermost circumference on an optical disk sequentially given track numbers (e.g., from track number 1 to 20000) from the innermost circumference to the outermost circumference of the disk, where odd-numbered tracks are land tracks and even-numbered tracks are groove tracks.

For example, when information is continuously recorded onto or readout from successive tracks, numbering the tracks as shown in FIG. 11 has the advantage of enabling a continuous recording or readout operation without a track jump action from a land to a groove track, or from a groove to a land track. While in the embodiments in FIGS. 11 and 12, tracks are numbered, starting at the innermost circumference of the disk, they may, of course, be given numbers, beginning with the outer circumference of the disk.

The track numbering method explained in FIGS. 11 and 12 can also be applied to the embodiments of FIGS. 1 and 4.

Figure 13:
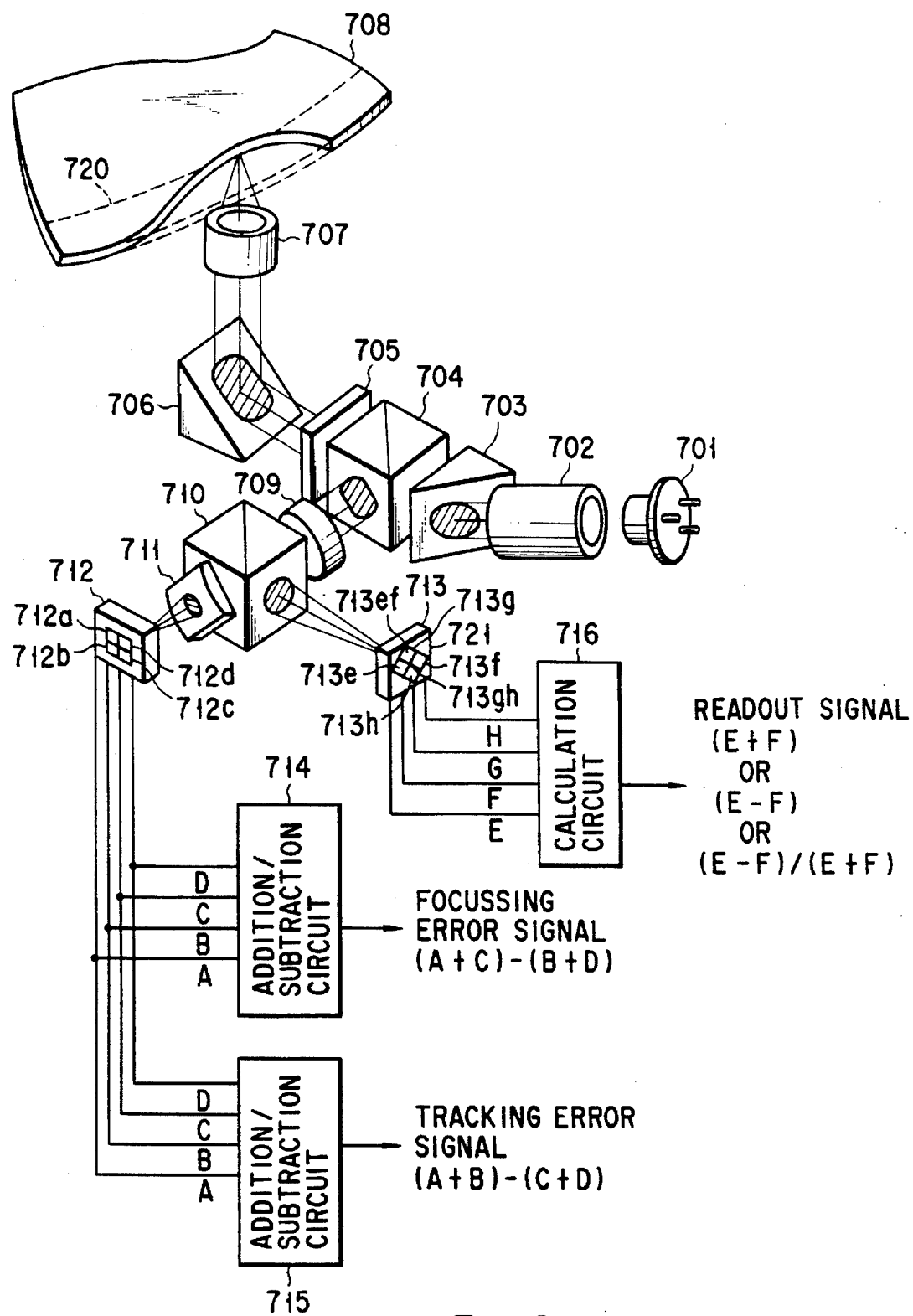
FIG. 13 shows a configuration of a portion of an optical recording and readout system according to an embodiment of the present invention.
Figure 14:
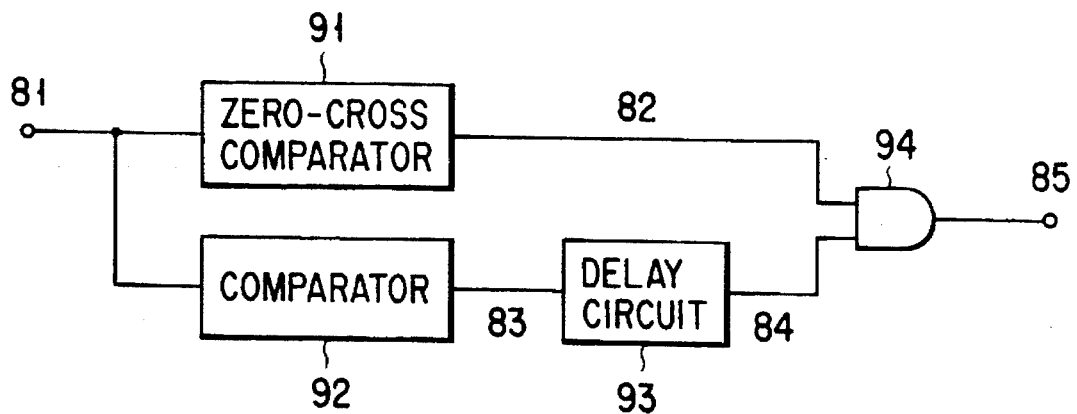
FIG. 14 is a block diagram of a data binarization signal generating circuit for mark position recording by the difference signal of the optical sensor output.
Figure 15A:
FIGS. 15A–15F are timing charts explaining the operation of the data binarization signal generating circuit of FIG. 14.
Figure 15B:
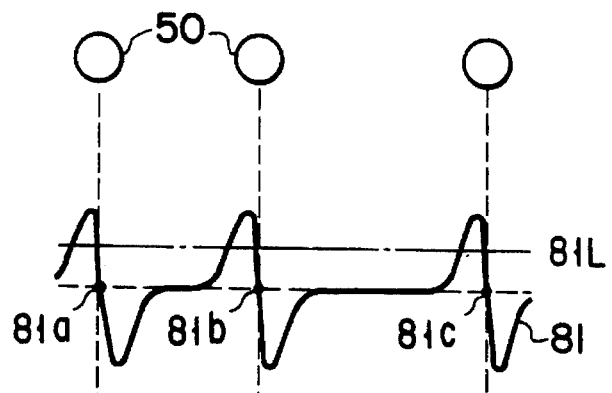
Figure 15C:
Figure 15D:
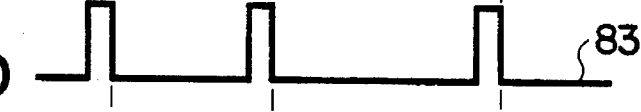
Figure 15E:
Figure 15F:
Figure 16:
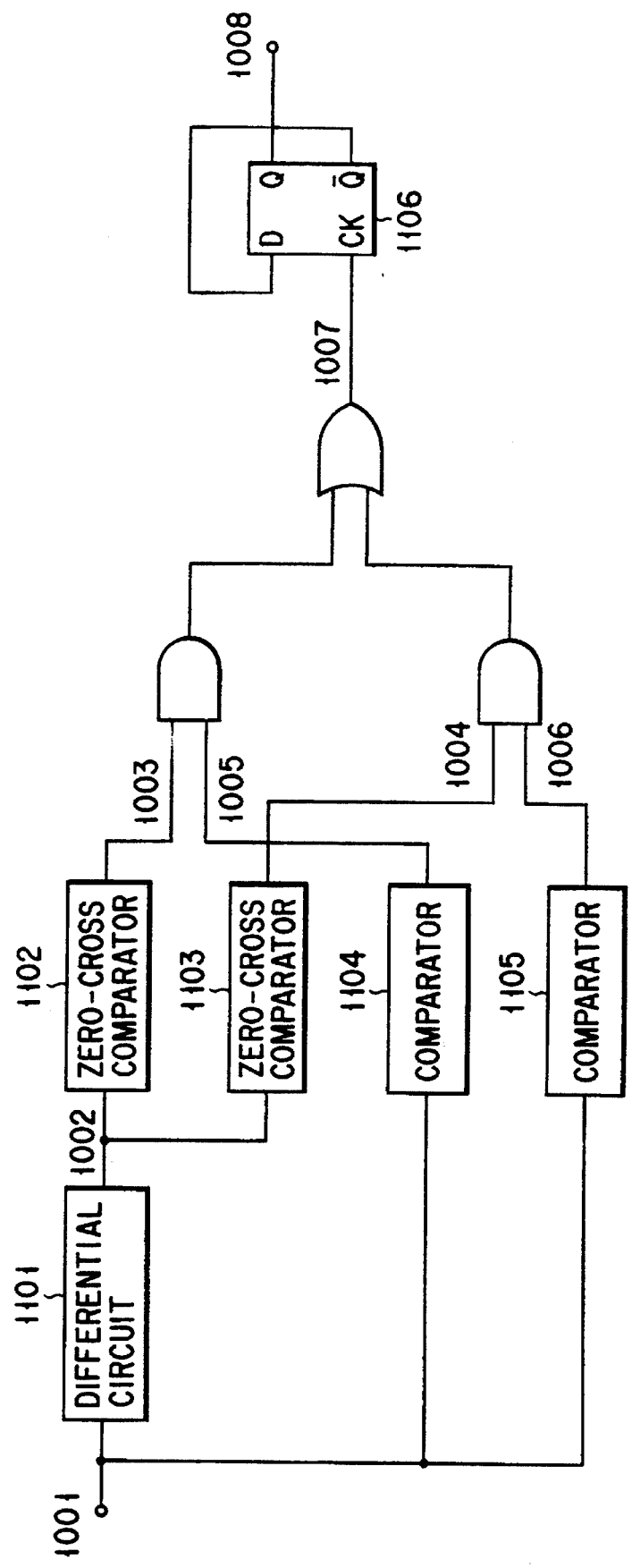
FIG. 16 is a block diagram of a data binarization signal generating circuit for mark edge recording by the difference signal of the optical sensor output.
Figure 17:
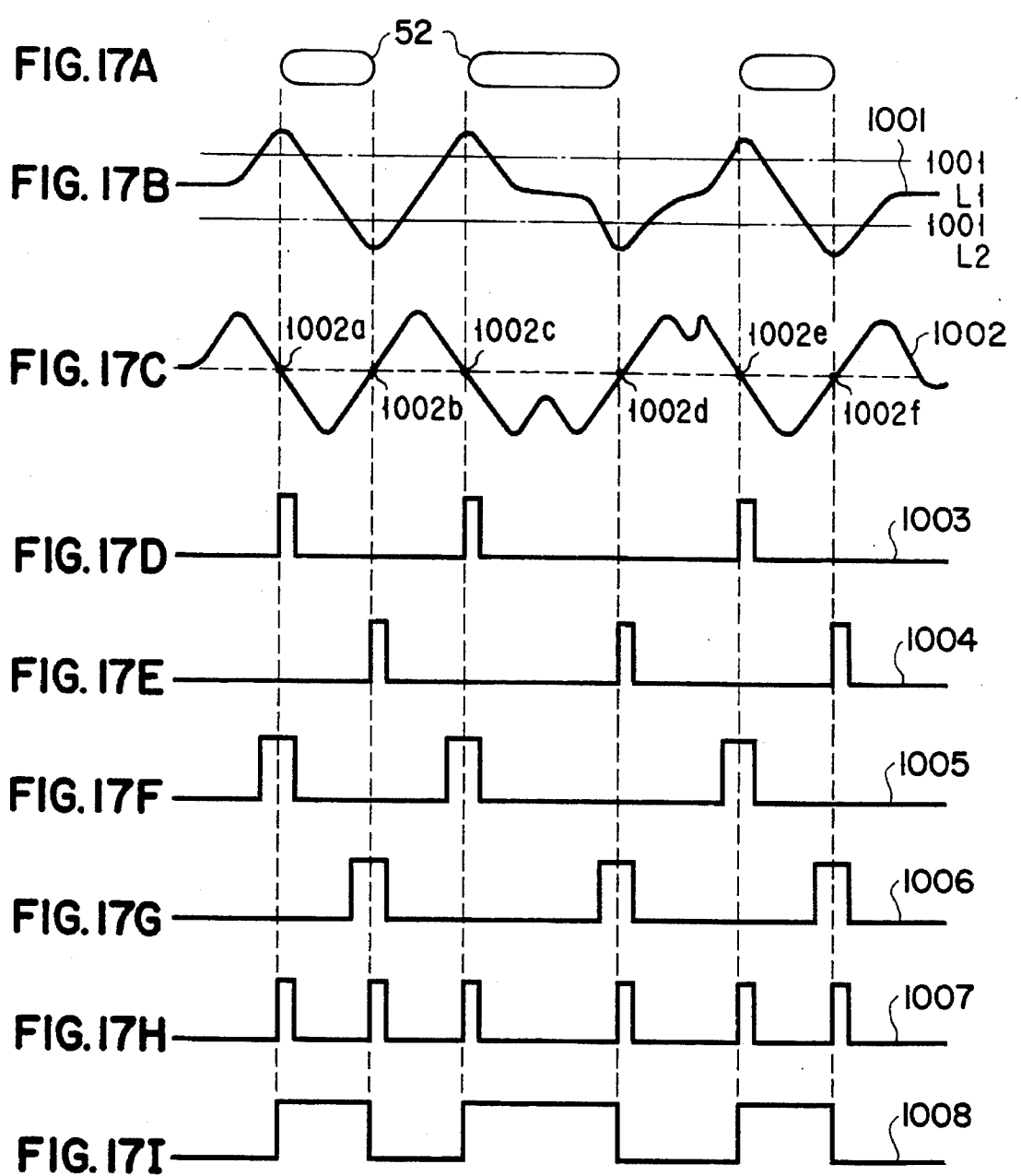
FIGS. 17A–17I are timing charts explaining the operation of the data binarization signal generating circuit of FIG. 16.
Figure 20:
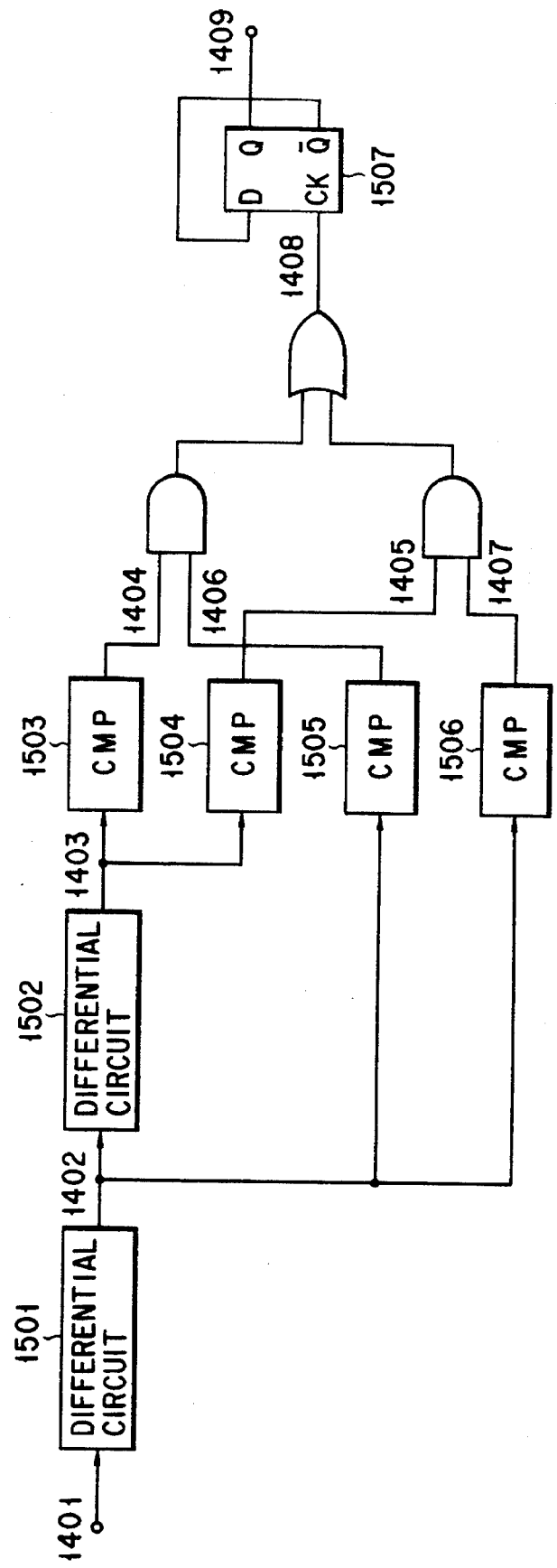
FIG. 20 is a block diagram of a data binarization signal generating circuit for mark position recording by the sum signal of optical sensor outputs.
Figure 21:
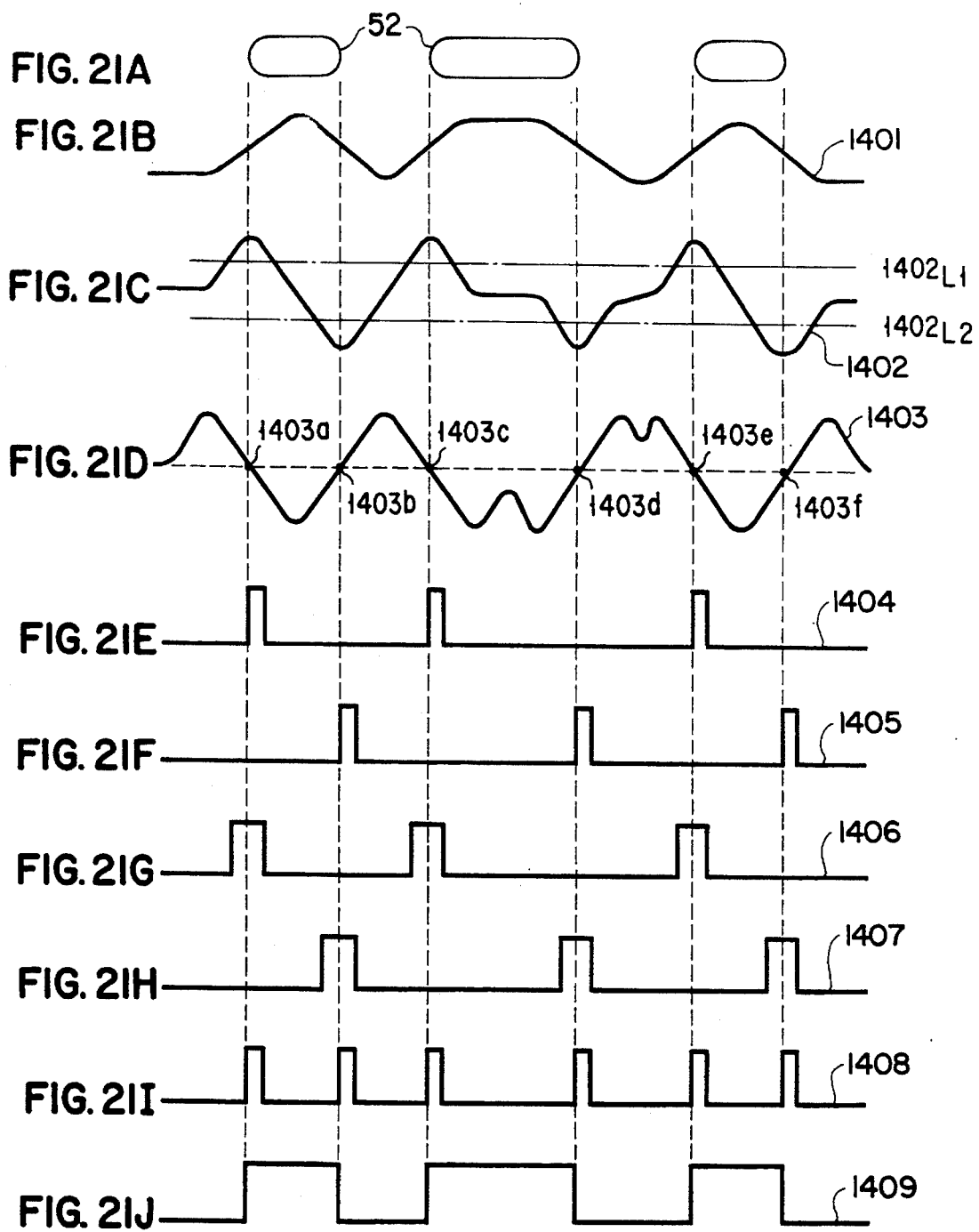
FIGS. 21F–21J are timing charts explaining the operation of the data binarization signal generating circuit of FIG. 20.

FIG. 13 shows a portion including the optical head system, of an optical recording and readout system used for recording and readout data onto or from the phase-change recording medium described above.

The optical beam emitted from a semiconductor laser 701 acting as a light source becomes parallel light at a collimating lens 702, and the optical beam having an anisotropic intensity distribution is converted into an optical beam having an isotropic intensity distribution at a beam shaping prism 703. Then, this converted beam enters a first beam splitter 704. The optical beam passed through the beam splitter 704 goes through a quarter-wave plate 705 and then is reflected by a reflecting mirror 706. This reflected beam is directed to an object lens 707, which focuses a very small spot on the medium surface of a phase-change optical disk 708. The collimating lens 702, beam shaping prism 703, beam splitter 704, quarter-wave plate 705, reflecting mirror 706, and object lens 707 constitute a first optical system for directing a optical beam to the phase-change optical disk 708.

The light reflected from the medium surface of the phase-change optical disk 708 again passes through the object lens 707, reflecting mirror 706, and quarter-wave plate 705 and is reflected at the beam splitter 704. The optical beam reflected from the beam splitter 704 is condensed at a focusing lens 709. The condensed light is divided into two optical beams at a second beam splitter 710. One of the two beams passes through a cylindrical lens 711 inclined 45 degrees and enters a four-segment photosensor 712, whereas the other optical beam directly enters another four-segment photosensor 713. The dividing lines 713$ef$ and 713$gh$ of the four-segment photosensor 713 are arranged so as to form an angle of 45 degrees with the projected image of the track 720 of the phase-change optical disk.

The photocurrent outputs A, B, C, and D of the light-receiving surfaces 712$a$, 712$b$, 712$c$, and 712$d$ of the four-segment sensor 712 are processed at adder-subtracter circuits 714 and 715 to produce a focussing error signal and a tracking error signal necessary to control the optical head. On the other hand, the photocurrent outputs E, F, G, and H of the light-receiving surfaces 713$e$, 713$f$, 713$g$, and 713$h$ of the four-segment sensor 713 undergo an arithmetic operation at an operations unit 716, which generates an information readout signal.

Specifically, the information readout signal is obtained using the expression (E+F), (E−F), or (E−F)/(E+F); the focussing error signal is obtained using the expression (A+C)−(B+D); and the tracking error signal is obtained using the expression (A+B)−(C+D). Here, because most of the diffracted light from the prepits or recording marks located in adjacent tracks strikes the light-receiving surfaces 713$g$ and 713$h$ of the four-segment optical sensor 713, crosstalk can be reduced by not using the photocurrent outputs G and H for the generation of an information readout signal.

The recording and readout system shown in FIG. 13 can be applied to optical disks shown in FIGS. 1 and 4.

A block diagram of a data binarization signal generating circuit and an operation explanatory diagram for mark position recording according to the present invention are shown in FIGS. 14 and 15A–15F. The zero-crossing position of a readout signal 81 obtained from a differential operation of photosensor outputs corresponds to the recording mark 50 center. The zero points 81$a$, 81$b$, and 81$c$ of the readout signal 81 are sensed by a zero-crossing comparator circuit 91, which produces a binarization pulse signal 82. On the other hand, the readout signal 81 is compared with a level 81L at a comparator circuit 92, which produces a first data gate signal 83.

The first data gate signal 83 is delayed for time DL by a delay circuit 93, which produces a second data gate signal 84 where the zero crossing points 81$a$, 81$b$, and 81$c$ of the readout signal are nearly in the center. The binarization pulse signal 82 and the second data gate signal 84 are supplied to an AND gate, which produces an AND output, or a data binarization pulse signal 85.

While in the illustrated embodiment, the data gate signal 84 is produced from the readout signal 81 obtained from a differential operation of optical sensor outputs, the data gate signal may be produced by comparing a signal obtained by adding optical sensor outputs with a specified value, as in the prior art. Because mark position recording requires no differential operation in generating data binarization pulses according to the present invention, the data binarization pulses are more immune to noises introduced in the readout signal. Furthermore, because the differential operation reduces laser noise, the noise-to-signal ratio of the readout signal is increased, thereby improving the data reliability of the optical disk apparatus.

A block diagram of a data binarization signal generating circuit and an operation explanatory diagram for mark edge recording according to the present invention are shown in FIGS. 16 and 17A–17I. The peak position of a readout signal 1001 obtained by differentiating the output from the photosensor corresponds to the recording mark 25 edge. The readout signal 1001 is differentiated at a differential circuit 1101, which produces an output 1002. A first zero-crossing comparator circuit 1102 senses zero points 1002a, 1002c, and 1002e from the differential output 1002 in the direction going from the positive to the negative, and produces a first binarization pulse signal 1003. Similarly, a second zero-crossing comparator circuit 1103 senses zero points 1002b, 1002d, and 1002f from the differential output 1002 in the direction going from the negative to the positive, and produces a second binarization pulse signal 1004.

On the other hand, the readout signal 1001 is compared with a first level 1001L1 at a third comparator circuit 1104, which produces a first data gate signal 1005. Similarly, the readout signal 1001 is compared with a second level 1001L2 at a fourth comparator circuit 1105, which produces a second data gate signal 1006. The AND signal of the first data gate signal 1005 and the first binarization pulse signal 1003 is ORed with the AND signal of the second data gate signal 1006 and the second binarization pulse signal 1004, which thus produces an OR output 1007. The OR output 1007 is supplied to the clock CK of a ½-frequency divider circuit made up of a D flip-flop, which produces a desired data binarization signal 1008 at the output Q.

As explained above, with the present invention, because the number of differential processes can be decreased in data binarization, the data binarization pulses are more immune to noises introduced in the readout signal, thereby improving the data reliability of the optical recording and readout system remarkably when a signal obtained by dividing the differential signal of the invention by the sum signal is used as a readout signal, fluctuations in the level of the read out signal due to defects in the optical disk or the change of the medium's reflectivity are reduced, resulting in much higher reliability of the data binarization processing.

In a readout signal sensing method which takes a partial sum of optical sensor outputs, a block diagram of a data binarization signal generating circuit and an operation explanatory diagram for mark position recording are shown in FIGS. 18 and 19A–19F. A block diagram of a data binarization signal generating circuit and an operation explanatory diagram for mark edge recording are shown in FIGS. 20 and 21A–21J.

A readout signal 1201 in mark position recording has a Gaussian waveform with a peak at the center of the recording mark 50. When a binarization signal is generated, the readout signal 1201 is differentiated at a differential circuit 1301, which produces an output 1202. Then, a zero-crossing comparator circuit 1302 senses zero points 1202a, 1202b, and 1202c from the differential output 1202 in the direction going from the positive to the negative and produces a binarization pulse signal 1203.

On the other hand, the readout signal 1201 is compared with a level 1201L1 at a comparator circuit 1303, which produces a data gate signal 1204. A data binarization pulse signal 1205 is produced from the AND output of the data gate signal 1204 and the binarization pulse signal 1203. The above process decreases the danger of sensing data erroneously due to noise.

A readout signal 1401 in mark edge recording has a waveform overlapped with the above-mentioned Gaussian waveform in terms of time. When a binarization signal is generated, the readout signal 1401 is differentiated at a differentiator 1501, which produces an output 1402. The peak position of the first-order differential output corresponds to a recording mark edge. Then, the first-order differential output is further differentiated at a differential circuit 1502, which produces an output 1403. From the second-order differential output 1403, a first zero-crossing comparator circuit 1503 senses zero points 1403a, 1403c, and 1403e in the direction going from the positive to the negative, thereby producing a first binarization signal 1404. Similarly, from the differential output 1403, a second zero-crossing comparator circuit 1504 senses zero points 1403b, 1403d, and 1403f in the direction going from the positive to the negative, thereby producing a second binarization signal 1405.

On the other hand, the first-order differential output 1402 is compared with a first level 1402L1 at a third comparator circuit 1505, which produces a first data gate signal 1406. Similarly, the first-order differential output 1402 is compared with a second level 1402L2 at a fourth comparator circuit 1506, which produces a second data gate signal 1407.

Figure 22:
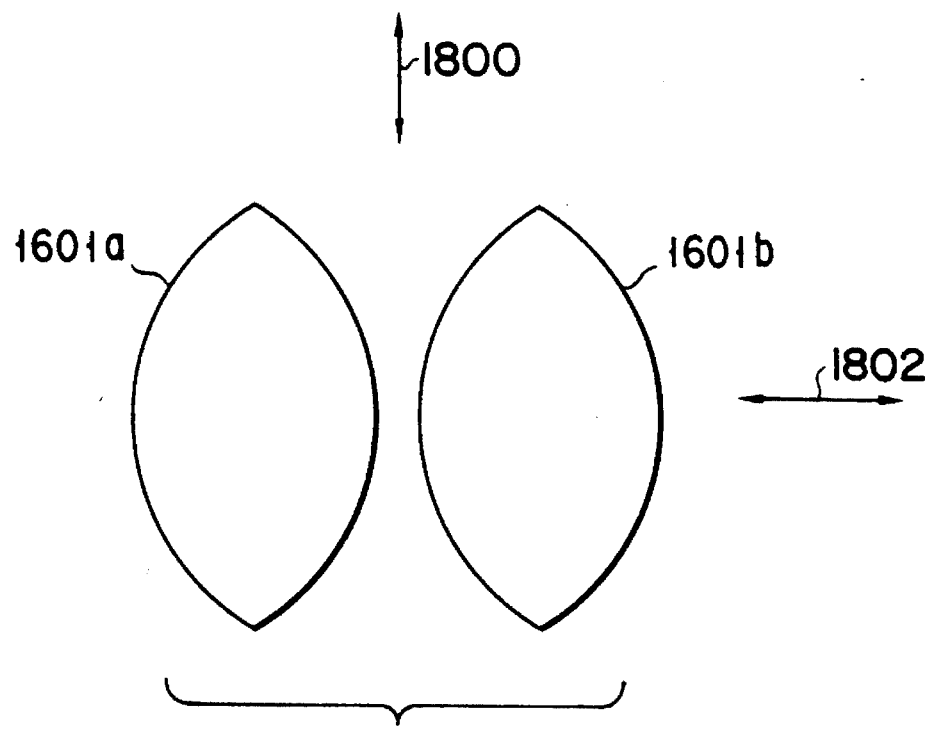
FIG. 22 shows the structure and layout of an optical sensor used in the optical recording and readout system.
Figure 23:
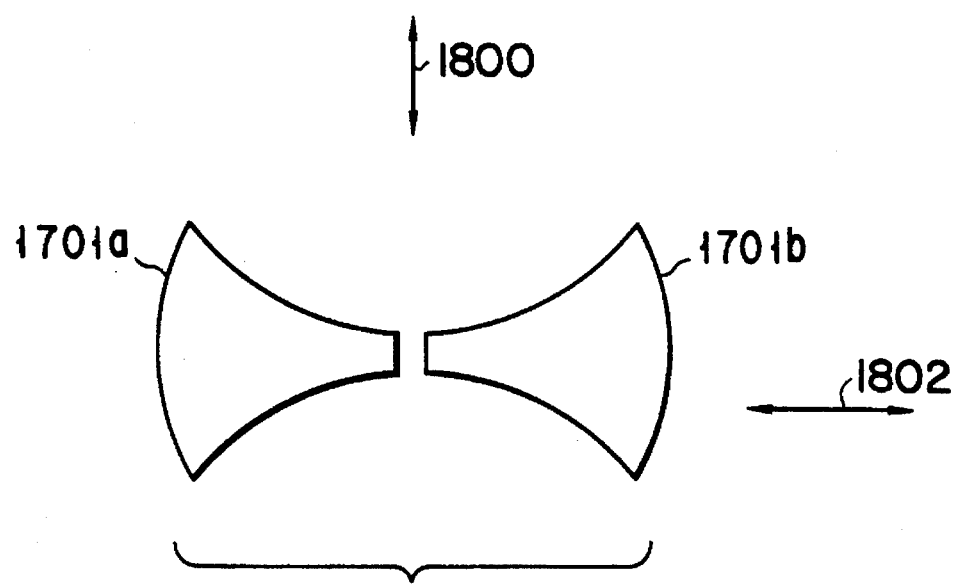
FIG. 23 shows the structure and layout of another optical sensor used in the optical recording and readout system.

The AND output of the first data gate signal 1406 and the first binarization pulse signal 1406 is ORed with the AND output of the second data gate signal 1407 and the second binarization pulse signal 1405, which thus produces an OR output 1408. The OR output 1408 is supplied to the clock CK of a ½-frequency divider circuit made up of a D flip-flop 1507, which produces a desired data binarization signal 1409 at the output Q.

while in the recording and readout system of FIG. 13, a four-segment photosensor whose dividing lines are arranged so as to form an angle of 45 degrees with the projected image of a track on the optical disk, two-segment photosensors as shown in FIGS. 22 and 23 may be used. In the two-segment photosensor of FIG. 22, two leaf-shaped photoelectric elements are arranged side by side in the direction crossing the tracks at right angles, or in the direction perpendicular to the tracks. In the two-segment photosensor of FIG. 23, two trumpet-shaped photoelectric elements are arranged side by side in the vertical direction of the recording track, with their tapered portions back to back. In FIGS. 22 and 23, arrow 1800 indicates the vertical direction of the recording track and arrow 1802 indicates the track direction. With such two-segment photosensors, when an image of tracks on the optical disk is projected so as to be divided into two on the light-receiving surface by the dividing line of the photosensor, thus producing a readout signal, it is possible to reduce the danger of sensing data erroneously due to noise.

Particularly, because the two-segment photosensor of FIG. 23 is made semicircular so that the diffracted light from prepits and recording marks on adjacent tracks may be eliminated as much as possible, this produces a good readout signal.

A readout signal is obtained by performing an operation on the outputs A and B of the individual light-receiving surfaces 1601a and 1601b of the two-segment photosensor of FIG. 22 and those of the individual light-receiving surfaces 1701a and 1701b of the two-segment photosensor of FIG. 23, using the expression (A+B), (A−B), or (A+B)/(A−B).

As has been explained, with the present invention, a stable focus servo and track servo can be realized for an optical disk suitable for land & groove recording with a narrower track pitch. In addition, crosstalk from adjacent tracks can be reduced with a simple configuration. Consequently, it is possible to realize an optical recording and readout system with higher data reliability and greater recording density than those with a conventional equivalent.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A phase-change optical recording medium comprising:
   a data recordable area containing land tracks and groove tracks on both of which user information is recorded, said land tracks and said groove tracks being alternately disposed on said data recordable area; and
   a header area on which header information is recorded in rows of prepits, said rows of prepits being arranged in every other track with respect to said tracks included in said data recordable area.

2. A phase-change optical recording medium according to claim 1, wherein said rows of prepits are disposed in said header area in correspondence with said land tracks.

3. A phase-change optical recording medium according to claim 1, wherein said groove tracks have a groove depth of approximately $\lambda/6$, where $\lambda$ is a wavelength of an optical beam landing on said recording medium.

4. A phase-change optical recording medium according to claim 1, wherein when an optical beam landing on said recording medium has a diameter of an optical beam whose intensity is $1/e^2$ of a maximum intensity, where e is an natural logarithm, a track pitch between adjacent tracks is set at one-third said diameter of said optical beam.

5. A phase-change optical recording medium according to claim 1, wherein said header information is further recorded in rows of prepits corresponding to each track in said data recordable area, said prepits in adjacent rows being placed in a staggered fashion so that a binary information signal corresponding to said header information has a sign which is inverted at each of said tracks.

6. A phase-change optical recording medium according to claim 1, wherein said header information includes track numbers set so as to increase in every other track from an inner to an outer circumference of said recording medium or from said outer to said inner circumference, and to again increase in every other track of said remaining tracks from said inner to said outer circumference or from said outer to said inner circumference.

7. A phase-change optical recording medium according to claim 1, wherein said header information includes track numbers set so as to increase sequentially from an innermost or an outermost circumference of said recording medium.

8. A phase-change optical recording medium comprising:
   a data recordable area containing land tracks and groove tracks on both of which user information is recorded, said land tracks and said groove tracks being alternately disposed in said data recordable area, and
   a header area in which header information is recorded in a plurality of rows of prepits, each row of prepits in said plurality of rows of prepits being arranged so as to correspond to one of said land and said groove tracks.

9. A phase-change optical recording medium according to claim 8, wherein said groove tracks have a groove depth of approximately $\lambda/6$, where $\lambda$ is a wavelength of an optical beam landing on said recording medium.

10. A phase-change optical recording medium according to claim 8, wherein when an optical beam landing on said recording medium has a diameter of an optical beam whose intensity is $1/e^2$ of a maximum intensity, where e is an natural logarithm, a track pitch between adjacent tracks is set at one-third said diameter of said optical beam.

11. A phase-change optical recording medium according to claim 8, wherein said prepits in each row of prepits are placed in a staggered fashion between adjacent prepit rows so that a binary information signal corresponding to said header information has a sign that is inverted at each of said tracks.

12. A phase-change optical recording medium according to claim 8, wherein said header information includes track numbers set so as to increase in every other track from an inner to an outer circumference of said recording medium or from said outer to said inner circumference, and to again increase in every other track of said remaining tracks from said inner to said outer circumference or from said outer to said inner circumference.

13. A phase-change optical recording medium according to claim 8, wherein said header information includes track numbers set so as to increase sequentially from an innermost or an outermost circumference of said recording medium.

14. An optical recording and readout system for recording and reading out information onto and from a phase-change optical recording medium, comprising:
   first optical means for projecting a plurality of optical beams onto said phase-change optical recording medium;
   second optical means for picking out reflected light from said optical recording medium;
   optical sensor means for sensing said reflected light picked out by said second optical means to output a light sense signal; and
   signal generating means for producing an information signal from said light sense signal from said optical sensor means, wherein said phase-change optical recording medium contains a data recordable area containing land tracks and groove tracks on both of which main information is recorded, said land tracks and said groove tracks being alternately disposed on said data recordable area, and a header area in which header information is recorded in rows of prepits, said rows of prepits being arranged in every other track with respect to said tracks included in said data recordable area.

15. A phase-change optical recording and readout system according to claim 14, wherein said optical sensor means produces three light sense signals corresponding to three optical beams, said three optical beams including a central optical beam and two side optical beams on both sides of said central optical beam, and wherein said signal generating means includes readout means for processing said light sense signals and generating three readout signals, and recording control means for sensing a data recording address from at least one of said three readout signals and generating a data recording start signal.

16. A phase-change optical recording and readout system according to claim 15, wherein said recording control means includes three address sensing circuits for receiving said three readout signals to detect an address therefrom, and outputting address coincidence signals, two delay circuits for delaying said address coincidence signals from said readout signals corresponding to said side optical beams for a specified period of time, and means for selecting one of said output signals, which are output from said address sensing circuit receiving said readout signal corresponding to said central optical beam and said delay circuits, as a data recording start signal.

17. A phase-change optical recording and readout system according to claim 15, wherein said recording control means includes switching circuit means for switching between said three readout signals according to header information, an address sensing circuit for sensing an address from said readout signal selected by said switching circuit means and outputting an address coincidence signal, two delay circuits for delaying said address coincidence signals sensed from said readout signals corresponding to said side optical beams for specified periods of time, and means for selecting signals from one of said delay circuits and said address coincidence signal sensed from said readout signal corresponding to said central optical beam as a data recording start signal.

18. A phase-change recording and readout system according to claim 14, wherein said optical sensor means includes a light-receiving surface having a nonphotosensitive area and at least two photosensitive areas divided by said nonphotosensitive area, wherein when an image corresponding to said reflected light is projected onto said photosensitive areas of said light-receiving surface as at least two divided images, and when said output signals corresponding to said photosensitive areas of said optical sensor means are determined to be A and B, said signal generating means produces said information signal using an expression (A–B) or (A–B)/(A+B).

19. An optical recording and readout system according to claim 14, wherein when each of said optical beams has a diameter of an optical beam whose intensity is $1/e^2$ of a maximum intensity, where e is an natural logarithm, a track pitch between adjacent tracks is set at one-third said diameter of said optical beam.

20. An optical recording and readout system for recording and reading out information onto and from a phase-change optical recording medium, comprising:

first optical means for projecting at least one optical beam onto said phase-change optical recording medium;

second optical means for picking out reflected light from said optical recording medium;

optical sensor means for sensing said reflected light picked out by said second optical means; and signal generating means for producing an information signal from an output signal from said optical sensor means, wherein said phase-change optical recording medium contains a data recordable area containing land tracks and groove tracks on both of which main information is recorded, said land tracks and said groove tracks being alternately disposed on said data recordable area, and a header area in which header information is recorded in rows of prepits, wherein each row of prepits is arranged in correspondence with one of said land and said groove tracks.

21. A phase-change optical recording and readout system according to claim 20, wherein said optical sensor means produces a light sense signal corresponding to a single optical beam, and wherein said signal generating mean contains readout means for processing said light sense signal and generating a single readout signal, and recording control means for sensing a data recording address from said readout signal and generating a data recording start signal.

22. A phase-change optical recording and readout system according to claim 21, wherein said recording control means comprises means which delays an address coincidence signal for a specified period of time to produce a data recording start signal when a recording position of header information is on a track in the front in an optical beam scanning direction, and which outputs an address coincidence signal as a data recording gate signal when the recording position of header information is on a track in the rear in the optical beam scanning direction.

23. A phase-change optical recording and readout system according to claim 20, wherein said optical sensor means produces light sense signals corresponding to two optical beams, and said signal generating mean contains readout means for processing said light sense signals and generating two readout signals, and recording control means for sensing a data recording address from said readout signals and generating a data recording start signal.

24. A phase-change optical recording and readout system according to claim 23, wherein said recording control means comprises two address sensing circuit means for receiving said two readout signals to detect an address, and outputting address coincidence signals, and means for selecting one of said address coincidence signals from said two address sensing circuits as a data recording start signal.

25. A phase-change optical recording and readout system according to claim 20, wherein said optical sensor means contains a light-receiving surface having a nonphotosensitive area and at least two photosensitive areas divided by the nonphotosensitive area, wherein when an image corresponding to said reflected light is projected onto said photosensitive areas of said light-receiving surface as two divided images, and when said output signals corresponding to said photosensitive areas of said optical sensor means are determined to be A and B, said signal generating mean produces said information signal using an expression (A–B) or (A–B)/(A+B).

26. An optical recording and readout system according to claim 20, wherein when said optical beam has a diameter of an optical beam whose intensity is $1/e^2$ of a maximum intensity, where e is an natural logarithm, a track pitch between adjacent tracks is set at one-third said diameter of said optical beam.

27. A method of recording or reading out information on or from a phase-change optical recording medium, comprising:

a step of preparing a phase-charge optical recording medium comprising a data recordable area containing land tracks and groove tracks on both of which user information is recorded, said land tracks and said groove tracks being alternately disposed on said data recordable area, and a header area on which header information is recorded in rows of prepits, said rows of prepits being arranged in every other track with respect to said tracks included in said data recordable area; and a step of scanning said land tracks, said groove tracks and said rows of prepits using three optical beams to record information thereon or read out information therefrom.

28. A method of recording or reading out information on or from a phase-change optical recording medium, comprising:

a step of preparing a phase-change optical recording medium comprising a data recordable area containing land tracks and groove tracks on both of which user information is recorded, said land tracks and said groove tracks being alternately disposed in said data recordable area, and a header area in which header information is recorded in rows of prepits, wherein each row of prepits is arranged in correspondence with one of said land and said groove tracks; and a step of scanning said land tracks, said groove tracks and said rows of prepits using an optical beam to record information thereon or read out information therefrom.

29. A phase-change optical recording and reproducing system comprising:

a recording medium comprising:

a data recordable area containing land tracks and groove tracks on both of which user information is recorded, said land tracks and said groove tracks being alternately disposed on said data recordable area; and a header area on which header information is recorded in rows of prepits, wherein said rows of prepits are arranged in every other track with respect to said tracks included in said data recordable area;

wherein at least two optical beams are impinged on said recording medium for recording or reproducing information so that said header information is reproduced by one of said two optical beams.

30. A phase-change optical recording and reproducing system according to claim 29, wherein said two optical beams are used for recording information on said data recordable area and for reproducing recorded information therefrom.

31. A phase-change optical recording and reproducing system according to claim 30, wherein one of said two optical beams is used for recording information on said data recordable area and reproducing recorded information therefrom.

* * * * *